3,477,922
ELECTROCHEMICAL PROCESS
Ernest Thomson Blues, Norton-on-Tees, England, assignor to Imperial Chemical Industries Limited, London, England, a corporation of Great Britain
No Drawing. Filed Feb. 11, 1966, Ser. No. 526,689
Claims priority, application Great Britain, Feb. 19, 1965, 7,287/65; June 24, 1965, 26,821/65
Int. Cl. B01k 1/00; C07c 127/02
U.S. Cl. 204—59     10 Claims

ABSTRACT OF THE DISCLOSURE

There is provided a process for producing organic isocyanates, urethanes or ureas in an electrolytic cell by contacting an anode with a solution of a readily ionisable cyanate or isocyanate, an aromatic compound having at least one hydrogen atom or an olefinic compound. A current is passed through the cell and an isocyanate is produced, but when the solution also contains an alcohol, phenol, primary or secondary amine, a urethane or urea is produced.

---

The invention relates to an electrochemical process.

According to the invention a process of producing organic isocyanates, urethanes or ureas in an electrolytic cell, comprises contacting a solution which is free from interfering anions and which comprises a readily ionisable cyanate or isocyanate and at least one compound selected from the group consisting of those aromatic compounds containing at least one hydrogen atom and the olefinic compounds and, when a urethane or urea is the desired product, an alcohol or phenol or a primary or secondary amine respectively; with an anode, and passing a current through the cell.

It will be understood that the above process will be carried out in a cell comprising an anode, cathode and the solution. Considerable variation in the type of cell is possible, however; for example it may consist of two electrodes and one electrolyte; one of the electrodes may be surrounded by a porous barrier; or each electrode may be in contact with a different electrolyte, the electrolytes being separated by an ion exchange membrane.

Organic mono- di- and poly-isocyanates may be produced.

Preferably the solution contacting the anode comprises no anions other than cyanate ions, but, dependent on the organic reactant, a variety of noninterfering anions may be present; for example, when the organic reactant is an olefinic compound, benzene or an alkyl benzene, ions having a higher discharge potential than cyanate ions may be present, the potential being controlled so that such ions do not react.

Suitable aromatic compounds include benzene and naphthalene and their mono- and dialkyl derivatives such as the xylenes, particularly their monoalkyl derivatives such as ethyl benzene and toluene, their other mono- and disubstituted derivatives such as chlorobenzene, β-bromonaphthalene and dinitrobenzene, the heterocyclic aromatics such as thiophene, pyrrole or furan and organic metallic aromatics such as ferrocene.

Suitable olefinic compounds include the olefines such as ethylene, n-octene-1 and isobutene and the conjugated and nonconjugated diolefines such as penta-1,4-diene, piperylene and butadiene. It is desirable, when the olefinic compound is volatile, to apply a sufficient pressure to maintain a high concentration of it in the anolyte; for example with ethylene and propylene pressures of from 15 to 300 pounds per square inch absolute may be employed.

A solvent which is not significantly decomposed under the electrolysis conditions and is substantially inert to the products, reactants, and any reactive species which occur and in particular is inert to attack by the discharge of cyanate ions, may be present at the anode. It is desirable that for example water should be absent, as this reacts with most of the organic isocyanate products. Preferably such a solvent has a boiling point differing widely from the product of the reaction, to facilitate separation of the product.

The choice of a suitable solvent will depend on the reaction system used, but for many purposes, ethers, particularly the lower ethers, the lower nitriles, for example acetonitrile, or nitromethane are preferred.

Preferably the phenol or the primary or secondary amine has at most twelve carbon atoms per molecule, and is more preferably a lower alcohol having at most six carbon atoms.

The reaction involved may be represented as follows:

$$R^INCO + HX \rightarrow R^INHCOX$$

in which $R^I$ is an alkyl, cycloalkyl, or aryl group (which may be substituted, for example by —NCO or NHCOX groups, halogen atoms, nitro groups or alkoxy groups) and X is a group of formlua $OR^{II}$, $NR^{II}R^{III}$ or $NHR^{II}$ in which $R^{II}$ and $R^{III}$ are alkyl, cycloalkyl or aryl groups. When a material of formula HX as above defined is present, the overall resistance of the cell is normally considerably reduced, with a consequent reduction in the power consumption in the process.

Isocyanates may in most cases be recovered from the urethanes or ureas formed as above by cracking them. The compound HX is generally also recovered in this procedure.

Suitable readily ionisable cyanates or isocyanates (the distinction between cyanates and isocyanates is believed to apply only in the solid state, as the anions produced by both classes of compounds in solution are the same) are for example the cyanates of alkali and alkaline earth metals and of the lower tetraalkyl ammonium ions having at most 20 carbon atoms, and the isocyanates of aluminium, boron, or iron, which may be produced in situ by introducing aluminum, boron or iron fluorides to a solution containing cyanate ions; or cyanic acid. It is preferred to use a mixture of a cyanate of an alkali metal or of an alkaline earth metal with one or more of the isocyanates of aluminum, boron or iron; such a mixture may be represented by an empirical formula $$N(M(OCN)_4)_n$$

in which N is an alkali or alkaline earth metal, $n$ is the valency of the metal N, and M is aluminium, boron or iron.

It is highly desirable to prevent the organic isocyanate products of this process from coming into contact with nascent hydrogen or any other reducing agent at the cathode. To achieve this, the readily ionisable cyanate ions may be chosen such that its cations will deposit at the cathode at a lesser potential than the reduction potential of the organic isocyanate. Suitably, therefore, an isocyanate of copper or a noble metal such as silver, gold, ruthenium, rhodium ,palladium, platinum, iridium, or osmium, may be used. Alternatively, the cell may be divided, so as to prevent the organic isocyanate from coming into contact with the cathode. This may suitably be achieved by separating the anode and cathode compartments by an ion selective membrane. A membrane comprising an anion exchange resin may be used, for example a resin of the quaternary ammonium type such as is sold under the trade names "De-Acidite" FF and "Amberlite" IRA–401. The resin may be in the form of a self-supporting sheet but is more preferably spread on an inert supporting mesh such as nylon net. Membranes of this type are sold under the trade name "Permaplex" A20. Such a membrane will permit anions to pass through whilst obstructing the passage of cations and most uncharged molecules. If an anion exchange resin is used, cyanate ions will pass through, and passage of their cations will be obstructed; a source of cyanate ions should therefore be in the cathode compartment, as such cations will have to be discharged at the cathode.

The use of a divided cell has considerable advantages in that any or all of the compounds present in the two compartments of the cell may be different. It is necessary, however, that the liquid in both compartments should be made electrcially conducting by providing at least one ionisable substance in each compartment.

It will be appreciated that it is possible to carry out an analogous process using a membrane which is permeable to cations. Known cation permeable membranes tend to react with the isocyanate products of the invention however in their acid states, and it is therefore desirable to use them in their neutral form and/or to protect them from organic cyanate products for example by surrounding the anode by a porous screen, or by withdrawing the products soon after their formation.

In a divided cell it is possible to include small quantities of water in the cathode compartment, but the anode compartment should be substantially free from water and it is preferred that neither compartment should contain water.

According to a preferred form of this invention we provide a process in which organic isocyanates, urethanes or ureas are produced by passing a current through a cell divided by an anion exchange membrane, in which the anode compartment contains a solution which comprises urea and a phenol or alcohol and a cyanate or isocyanate of a metal as hereinafter defined; and in which the anode compartment contains in solution at least one compound selected from the group consisting of those aromatic compounds containing at least one replaceable hydrogen atom, and the olefinic compounds; and a readily ionisable cyanate or isocyanate, and, when a urethane or urea is the desired product, an alcohol or phenol or a primary or secondary amine, respectively.

Cyanates or isocyanates of metals to be used in the above form of the invention are those which, when electrolysed in a solution consisting of a substantial proportion of the phenol or alcohol to be used in this form of the invention and optionally, an inert solvent, produce, under conditions at which most of the products produced at the anode are isolated from the remainder of the solution, a metal alkoxide or phenoxide.

Cyanates or isocyanates of metals which are suitable include those of the alkali and alkaline earth metals or aluminium, or mixtures thereof, which may be as previously described.

In this system, the urea provides under the reaction conditions, a supply fresh cyanate ions to replace those consumed; ammonia and hydrogen are liberated in the cathode compartment and removed therefrom, for example by passing an inert gas through it. Thus, the concentration of the metal cyanate or isocyanate may be substantially maintained.

The presence of a phenol or alcohol is essential to this process using urea. Suitable phenols are, for example, the monohydroxylic mononuclear phenols such as the halophenols, the cresols, xylenols and phenol itself, and suitable alcohols include the mono- and polyhydric alcohols, but are preferably lower monohydroxyic alcohols having from one to five carbon atoms. However, materials such as naphthol may be used.

A coproduct occurring with the organic isocyanates produced in accordance with this invention is usually cyanic acid, particularly when an aromatic compound is used. For example, in the system using a divided cell with urea, the overall reaction will usually be as follows:

$$ArH + 2NH_2CONH_2 \rightarrow 2NH_3 + H_2 + HNCO + ArNCO$$

when Ar is an aryl radical.

It may be desired to provide as well as an aromatic reactant, an olefinic reactant to react in an addition reaction with cyanic acid formed, so producing additional organic isocyanate. This reaction is slow with ethylene, but rapid with other olefinic compounds.

It is normally desirable to carry out the process of this invention at from $-10$ to $80°$ C., usually in the range of 20 to $80°$ C., choosing as high a temperature as is consistent with not polymerising the product or causing other undesirable effects such as reducing the selectivity of any membrane used. Any cathode compartment is preferably maintained at a higher temperature than the anode compartment. Voltages across the cell of from 3 to 50 volts, and preferably from 5 to 25 volts are normally used, and anode potentials of 1.8 to 3.0 volts are preferred, particularly in the range of 1.8 to 2.5 volts. In some systems, potentials as low as 0.8 volt may be suitable, however.

The electrodes may be porous or consist of grids or plates, and are suitably of corrosion resistant material such as platinum or carbon, and need not necessarily be identical. A silver electrode may for example be used as the cathode (though not as the anode, as it is attacked by cyanate discharge), and a platinum electrode may be used as the anode. If a metal such as silver or copper is deposited on one electrode in the course of the process, it is preferred to use as that electrode, one made of the same metal.

EXAMPLE 1

An electrolytic cell comprised a platinum anode having an area of 400 sq. cm. separated from a silver gauze cathode by an anion permeable membrane. The electrolyte in the cathode compartment consisted of a slurry of potassium cyanate and urea crystals in tert.-butyl alcohol and the electrolyte in the anode compartment consisted of 1,2-dimethoxyethane, and benzene in a molar ratio of 5:1 and sufficient potassium cyanate to saturate the solution and thus render it conducting. The electrolyte in the cathode compartment was vigorously agitated by passing a stream of argon through it and the electrolyte in the anode compartment was stirred by a magnetic follower.

Current was supplied by a potentiostat controlled by a silver/silver cyanate reference electrode leading to the electrolyte in the anode compartment at a point in close proximity to the anode. With an anode potential of 1.8 volts against the silver/silver cyanate electrode, and a potential of 50 to 55 volts across the cell, the maximum cell current achieved within five hours was 0.021 amp corresponding to an anode current density of 0.00005 amp per square centimetre.

During electrolysis, the electrolyte in the anode compartment became acidic and the internal resistance of the cell decreased by a factor of about 1000.

Electrolysis was continued for five hours when about 0.0025 faraday had been passed through the cell. The infrafred spectrum of the anolyte indicated the presence of organic isocyanate. A minimum amount of 0.005 gram of phenyl isocyanate were produced, representing about 10% of the theoretical yield based on the current passed. A further 5% yield, based on the current passed, of biphenyl isocyanate was produced.

EXAMPLE 2

Electrolysis was conducted in a glass cell equipped with a cylindrical silver gauze cathode (150 cm.²) and a cylindrical platinum anode (200 cm.²) separated by an anion-selective membrane. The cathode compartment contained methanol (100 ml.), urea (18 g.; 0.3 mole) and potassium cyanate (0.015 mole) and was stirred by a stream of argon. The anode compartment contained methanol (150 ml.), anisole (0.2 mole) and potassium cyanate (0.01 mole). The anolyte was maintained at 20° C. and stirred by rapid recirculation (ca. 1 litre/min.) through a water-cooled heat-exchanger. The anode potential was maintained at 1.56 v. against a saturated calomel electrode until 0.18 faraday had passed through the cell. The applied potential was 5–6 volts and the current density about 0.01 amp/cm.$^2$. After electrolysis the anolyte was removed from the cell, concentrated by evaporation of the methanol on a water bath and extracted with diethyl ether. The ether extract was dried, freed from ether and distilled in vacuo to yield a mixture of o- and p-methoxy-N-phenylmethylurethane (5.6 g.; 0.031 mole) containing traces of the methylurethane derivatives of anisole-2,4-diisocyanate.

EXAMPLE 3

Example 2 was repeated but the anode potential was maintained at 1.75 volts against a saturated calomel electrode and benzene (0.2 mole) was used instead of anisole. After the passage of 0.15 faraday, distillation of the diethyl ether extract of the methanol-free products yielded N-phenylmethylurethane (3.8 g.; 0.025 mole). The residue (0.85 g.) from the distillation consisted largely of the methylurethane derivatives of 1,2- and 1,4-diisocyanatobenzene.

EXAMPLE 4

Example 3 was repeated using toluene (0.2 mole) instead of benzene. After the passage of 0.22 faraday, distillation of the diethyl ether extract of the methanol-free products yielded a mixture of o- and p-methyl-N-phenylmethylurethanes (4.0 g.; 0.024 mole).

EXAMPLE 5

Example 3 was repeated using diphenylmethane (0.14 mole) instead of benzene. After the passage of 0.2 faraday, the anolyte was freed from methanol and extracted with diethyl ether. Removal of the ether yielded a yellow oil (22 g.) which consisted of unreacted biphenylurethane (ca. 10 g.) and a mixture of the methylurethane derivatives of diphenylmethaneisocyanate and methoxydiphenylmethaneisocyanate.

EXAMPLE 6

Example 2 was repeated using isoprene (0.2 mole) instead of anisole. The anode was maintained at 1.95 volts against a saturated calomel electrode and the anolyte maintained at a temperature of 10° C. After the passage of 0.18 faraday, the products, free from methanol and unreacted isoprene were extracted with diethyl ether. Evaporation of the ether from the extract yielded a yellow oil (2.5 g.), consisting largely of the isomers I and II.

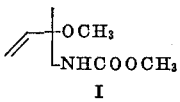  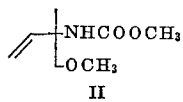

I  II

EXAMPLE 7

Example 6 was repeated using butadiene instead of isoprene and 1 atmosphere pressure. After the passage of 0.18 faraday the products were worked up as in Example 6 to yield a yellow oil (1.34 g.) containing the isomers III and IV.

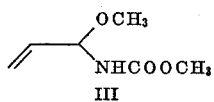  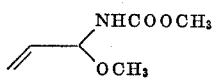

III  IV

EXAMPLE 8

Example 7 was repeated with the anolyte saturated at 10° C. at 1 atmosphere with ethylene instead of butadiene. The products were worked up as in Example 7 to yield a yellow oil (0.45 g.) containing N-ethylmethylcarbamate and N-(1-methoxyethyl)methylcarbamate.

EXAMPLE 9

Electrolysis was conducted on a cell similar to that described for Example 2 but divided by a cation-permeable membrane instead of an anion-permeable membrane. The catholyte consisted of methanol saturated with potassium cyanate at 20° C. The anolyte consisted of anisole (0.2 mole) in methanol (200 ml.) maintained saturated with potassium cyanate at 20° C. by recirculation through a chamber containing solid potassium cyanate. The anode potential was maintained at 1.56 volts against a saturated calomel electrode. After the passage of 0.1 faraday the anolyte, worked up as in Example 2 yielded a mixture of o- and p-methoxy-N-phenylmethylurethane.

EXAMPLE 10

Electrolysis was conducted in a three-compartment cell with a platinum anode and silver cathode. The anode compartment was separated from the centre compartment by an anion-permeable membrane. The cathode compartment contained methanol saturated with potassium cyanate and urea at 20° C. The centre compartment contained methanol maintained saturated with potassium cyanate at 20° C. by the addition of solid potassium cyanate. The anolyte consisted of anisole (0.2 mole) in methanol (150 ml.) saturated with potassium cyanate at 20° C. The anode potential was 1.56 volts against a saturated calomel electrode. After the passage of 0.5 faraday, the anolyte was worked up as in Example 2 to yield a mixture of o- and p-methoxy-N-phenylmethylurethane.

EXAMPLE 11

Electrolysis was conducted in a cell similar to that described for Example 2, but without a dividing membrane. The electrolyte consisted of methanol (250 ml.) containing anisole (0.2 mole) and maintained saturated with cadmium cyanate at 20° C. The anode potential was maintained at 15.6 volts against a saturated calomel electrode. After the passage of 0.1 faraday, the electrolyte, worked up as described for the anolyte from Example 2 yielded a mixture of o- and p-methoxy-N-phenylmethylurethanes.

EXAMPLE 12

Electrolysis was conducted in a glass cell equipped with a silver gauze cathode and a platinum anode separated by an anion exchange membrane. The cathode compartment contained methanol (100 ml.), urea (12 g.; 0.2 mole) and potassium cyanate (0.015 mole) stirred by a stream of argon. The anode compartment contained methanol (70 ml.), anisole (0.2 mole) and potassium cyanate (0.005 mole) stirred by a magnetic follower. A current of 2 amps was passed for 2½ hours (0.18 faraday approximately). The anode current density was about 0.01 amp/cm.$^2$, and the total potential drop across the cell was 5–6 volts. The anode potential was 1.56 volts against a saturated calomel electrode. The anolyte was added to water and extracted with ether. The ether extract was dried, freed from ether and distilled to yield a mixture of o- and p-methoxy-N-phenylmethylurethane (5.6 g.; about 34% based on current) contaminated with traces of the methylurethane derived from anisole-2,4-diisocyanate, and other anisole and methoxylated biphenyl derivatives.

I claim:

1. A process of producing organic isocyanates, in an electrolytic cell, which comprises contacting a solution which is free from anions having a lower discharge potential than cyanate ions, and which comprises a readily ionisable cyanate or isocyanate and at least one compound selected from the group consisting of aromatic compounds containing at least one hydrogen atom and monoolefines and diolefines, with an anode, and passing a current through the cell.

2. A process according to claim 1 in which an olefinic reactant is present in the anode compartment in addition to an aromatic reactant.

3. A process according to claim 1 in which the organic compound is benzene or naphthalene or a mono or dialkyl derivative thereof, an olefine having from 2–8 carbon atoms, or a diolefine having 4 or 5 carbon atoms.

4. A process according to claim 1 in which a solvent which is stable under the electrolysis conditions and is substantially inert to the products, reactants and any reactive species which occur, is present at the anode.

5. A process for the production of organic isocyanates according to claim 1 in which the electrolyte containing the anode is free from materials which are reactive towards organic isocyanates.

6. A process according to claim 1 wherein the readily ionisable cyanate has cations which will deposit at the cathode at a lesser potential than the redudction potential of the organic isocyanate.

7. A process according to claim 1 in which the cell is divided into anode and cathode compartments by an ion selective membrane.

8. A process in which organic isocyanates are produced by passing a current through a cell divided by an anion exchange membrane into anode and cathode compartments in which the cathode compartment contains a solution which comprises urea, a phenol or alcohol, and a cyanate or isocyanate of a metal which, if it were to be electrolysed in a solution comprising the phenol or alcohol which is present as aforesaid in the cathode compartment, produces when the products produced at the cathode are isolated from the remainder of the solution, a metal alkoxide or phenoxide, and in which the anode compartment contains in solution at least one compound selected from the group consisting of those aromatic compounds containing at least one replaceable hydrogen atom, and monoolefines and diolefinic, and a readily ionisable cyanate or isocyanate.

9. A process for the production of urethanes or ureas in an electrolytic cell, which comprises contacting a solution which is free from anions having a lower discharge potential than cyanate ions and which comprises a readily ionisable cyanate or isocyanate and at least one compound selected from the group consisting of aromatic compounds which contain at least one hydrogen atom and monoolefines and diolefines and a member selected from the group consisting of an alcohol, a phenol, and a primary or secondary amine; with an anode, and passing a current through the cell.

10. A process in which urethanes or ureas are produced by passing a current through a cell divided by an anion exchange membrane into anode and cathode compartments in which the cathode compartment contains a solution which comprises urea, a phenol or alcohol, and a cyanate or isocyanate of a metal which, if it were to be electrolysed in a solution comprising the phenol or alcohol which is present as aforesaid in the cathode compartment, produces when the products produced at the cathode are isolated from the remainder of the solution, a metal alkoxide or phenoxide, and in which the anode compartment contains in solution at least one compound selected from the group consisting of those aromatic compounds containing at least one replaceable hydrogen atom, and monoolefines and diolefines, and a readily ionisable cyanate or isocyanate and a member selected from an alcohol, phenol or primary or secondary amine.

References Cited

UNITED STATES PATENTS 3,347,758 10/1967 Koehl _____ 204—59

HOWARD S. WILLIAMS, Primary Examiner

U.S. Cl. X.R.

204—72